US008427690B2

(12) United States Patent
Watanabe

(10) Patent No.: US 8,427,690 B2
(45) Date of Patent: *Apr. 23, 2013

(54) METHOD FOR READING SEQUENTIALLY A MANUSCRIPT GROUP MADE OF PLURAL SHEETS

(75) Inventor: Yuichi Watanabe, Tokyo (JP)

(73) Assignee: Oki Data Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/524,581

(22) Filed: Jun. 15, 2012

(65) Prior Publication Data

US 2012/0250104 A1 Oct. 4, 2012

Related U.S. Application Data

(63) Continuation of application No. 12/181,446, filed on Jul. 29, 2008, now Pat. No. 8,203,736.

(30) Foreign Application Priority Data

Aug. 15, 2007 (JP) .................................. 2007-211898

(51) Int. Cl.
 *G06F 3/12* (2006.01)
(52) U.S. Cl.
 USPC ......... 358/1.15; 358/1.16; 358/488; 709/206; 399/92; 379/100.17
(58) Field of Classification Search .................. 358/474, 358/497, 496, 486, 1.15, 494, 462, 488, 1.16, 358/1.13; 399/92; 709/206
See application file for complete search history.

(56) References Cited

U.S. PATENT DOCUMENTS

| 5,176,628 | A | 1/1993 | Charles et al. | |
|---|---|---|---|---|
| 5,262,831 | A | 11/1993 | Iwata | |
| 5,276,628 | A | 1/1994 | Schneiderhan | |
| 5,978,620 | A | 11/1999 | Syeda-Mahmood | |
| 6,611,360 | B1 | 8/2003 | Kataoka | |
| 7,298,709 | B2 * | 11/2007 | Watanabe | 370/254 |
| 7,580,164 | B2 * | 8/2009 | Barrus et al. | 358/474 |
| 7,616,358 | B2 * | 11/2009 | Su et al. | 358/498 |
| 7,710,728 | B2 * | 5/2010 | Arisaka et al. | 361/719 |
| 7,719,728 | B2 | 5/2010 | Harada | |
| 7,929,186 | B2 * | 4/2011 | Kubota et al. | 358/474 |
| 7,933,051 | B2 * | 4/2011 | Nakawaki | 358/474 |

(Continued)

FOREIGN PATENT DOCUMENTS

DE 199 48 330 A1 3/2000
JP 2001-272889 A 10/2001

(Continued)

*Primary Examiner* — Negussie Worku
(74) *Attorney, Agent, or Firm* — Panitch Schwarze Belisario & Nadel LLP

(57) ABSTRACT

A method is provided for reading sequentially a manuscript group made of plural sheets and dividing the manuscript group into manuscript data. The manuscript group made of the plural sheets is read sequentially to produce reading data. Each reading data of the sheet produced at the reading step is analyzed and judged on whether or not the sheet is added with a predetermined mark. The manuscript group data is divided by the reading data of the sheet added with the predetermined mark into plural manuscript data in a case where the sheet is judged as being added with the predetermined mark at the judging step. Thereafter, each of the manuscript data including the reading data of the sheet added with the predetermined mark in a storing region is collectively stored.

14 Claims, 11 Drawing Sheets

| U.S. PATENT DOCUMENTS | | | | FOREIGN PATENT DOCUMENTS | | |
|---|---|---|---|---|---|---|
| 7,957,038 B2 * | 6/2011 | Kamasuka et al. ........... 358/474 | JP | 2002-044318 A | 2/2002 |
| 8,203,736 B2 * | 6/2012 | Watanabe .................... 358/1.15 | JP | 2002-354212 A | 12/2002 |
| 2006/0256375 A1 | 11/2006 | Abe | JP | 2003-333225 A | 11/2003 |
| 2006/0268369 A1 | 11/2006 | Kuo | JP | 2003-333264 A | 11/2003 |
| 2007/0139683 A1 | 6/2007 | Wegeng et al. | JP | 2006-088375 A | 4/2006 |
| 2007/0146776 A1 | 6/2007 | Suzuki | | | |
| 2007/0177204 A1 | 8/2007 | Kamasuka et al. | | | |

* cited by examiner

6: HEADER SHEET    61: IDENTIFICATION MARK PART

▲▲▲▲▲▲▲▲▲▲▲▲▲▲▲▲▲▲▲▲▲▲▲▲▲▲▲▲

―― < FILE MANAGEMENT PAGE > ――

62: MANUSCRIPT SORT MARK PART

PLEASE TICK THE CORRESPONDING SORT OF ORIGINAL DOCUMENT

- ☑ CATALOG (COLOR)
- ☐ BILL/RECEIPT/INVOICE(COLOR)
- ☐ PHOTO (COLOR)
- ☐ BILL/RECEIPT/INVOICE (MONOCHROME)
- ☐ CATALOG (MONOCHROME)
- ☐ HIGH QUALITY COMMERCIAL DOCUMENT (COLOR)
- ☐ PHOTO (MONOCHROME)
- ☐ HIGH QUALITY COMMERCIAL DOCUMENT(MONOCHROME)
- ☐ TILE PRINT/MEMO
- ☐ LOW QUALITY COMMERCIAL DOCUMENT (COLOR)
- ☐ RECEIVED ORIGINAL FAX
- ☐ LOW QUALITY COMMERCIAL DOCUMENT(MONOCHROME)

PLEASE DESCRIBE THE RELATED CONTENTS OF THIS FILE:

KEYWORD:
MAKE DATE:
ABSTRACT:

63: MANUSCRIPT CONTENT DESCRIBING PART

*FIG. 4*

| SERIAL NUMBER | MANUSCRIPT SORT | RESOLU-TION | DENSITY | COMPRESS-ION RATE | MODE | COLOR |
|---|---|---|---|---|---|---|
| 1 | CATALOG (COLOR) | 300dpi | NORMAL | NORMAL | Mixed | ON |
| 2 | PHOTO (COLOR) | 400dpi | NORMAL | NORMAL | Photo | ON |
| 3 | TILE PRINT / MEMO | 75dpi | THICK | HIGH | Normal | OFF |
| 4 | BILL / RECEIPT / INVOICE (MONOCHROME) | 200dpi | THICK | HIGH | Text | OFF |
| 5 | HIGH QUALITY COMMERCIAL DOCUMENT (COLOR) | 300dpi | NORMAL | NORMAL | Mixed | ON |
| 6 | LOW QUALITY COMMERCIAL DOCUMENT (MONOCHROME) | 150dpi | THICK | NORMAL | Mixed | OFF |
| 7 | BILL / RECEIPT / INVOICE (COLOR) | 200dpi | NORMAL | HIGH | Text | ON |
| 8 | RECEIVED ORIGINAL FAX | 100dpi | THICK | HIGH | Mixed | OFF |

*FIG. 5*

METHOD FOR READING SEQUENTIALLY A MANUSCRIPT GROUP MADE OF PLURAL SHEETS

CROSS-REFERENCE TO RELATED APPLICATIONS

This application is a continuation of copending U.S. application Ser. No. 12/181,446 filed Jul. 29, 2008, the entire disclosure of which is incorporated herein by reference.

BACKGROUND OF THE INVENTION

1. Field of the Invention

The invention relates to a method for reading image that reads manuscript and memorizes image data of the manuscript.

2. Description of Related Art

Previously, in an image reading apparatus which reads manuscript and transmits image data to a data receiving device, when transmitting the read image data, transmits image data of plural manuscripts loaded on automatic original transmitting device as one file. Moreover, the technology to set each single page of plural manuscripts loaded on automatic manuscript transmitting device as one file and to transmit respective files, is published (see, e.g. Japanese Unexamined Patent Application Publication No 2003-333264).

SUMMARY OF THE INVENTION

According to an aspect of the invention, an image reading method reads sequentially a manuscript group made of plural sheets and divides the manuscript group into manuscript data, and comprises the steps of reading sequentially the manuscript group made of the plural sheets to produce reading data, analyzing each reading data of the sheet produced at the reading step and judging whether or not the sheet is added with a predetermined mark, and dividing the manuscript group data by the reading data of the sheet added with the predetermined mark into plural manuscript data in a case where the sheet is judged as being added with the predetermined mark at the judging step, and thereafter, storing collectively each of the manuscript data including the reading data of the sheet added with the predetermined mark in a storing region. Further, according to another aspect of the invention, an image reading method reads sequentially plural sets of manuscripts as a manuscript group, and comprises the steps of reading sequentially the manuscript group, judging each set of the manuscript included in the manuscript group read at the reading step, and storing reading data of each set of the manuscript judged at the judging step. Moreover, according to another aspect of the invention, an image reading method reads sequentially a manuscript group made of plural sheets and divides the manuscript group into manuscript data comprises the steps of reading sequentially the manuscript group made of the plural sheets to produce reading data, analyzing each reading data of the sheet produced at the reading step and judging whether or not the sheet is added with a predetermined mark, and dividing the manuscript group data by the reading data of the sheet added with the predetermined mark into plural manuscript data in a case where the sheet is judged as being added with the predetermined mark at the judging step, and thereafter, storing collectively each of the manuscript data excluding the reading data of the sheet added with the predetermined mark in a storing region.

The above and other objects and features of this invention will become apparent from the following detailed description and the appended claims with reference to the accompanying drawings.

BRIEF DESCRIPTION OF THE DRAWINGS

FIG. 4 is a format explanatory diagram of a header sheet;

FIG. 5 is an explanatory diagram of the reading parameter table of respective manuscript sorts;

DETAILED DESCRIPTION OF THE PREFERRED EMBODIMENTS

Embodiments of the invention will be described in detail hereinbelow with reference to the drawings.

Embodiment 1

An image reading apparatus in embodiment 1, when using a flatbed scanning portion to transmit plural manuscripts in each single document, a header sheet in which manuscript sort and manuscript content information are described is inserted in front of each document, therefore, each manuscript is composed of header sheet (front sheet) and document sheet/sheets in pairs. The image reading apparatus identifies the header sheet, obtains the manuscript sort and the manuscript content information from the header sheet, and performs following process so as to make file per manuscript on the basis of the obtained information. To achieve the above purpose, the image reading apparatus of embodiment 1 is structured as below. In the following explanation, manuscript is formed from header sheet and a group of document sheets (or a single sheet) in pairs that contains collective content. Manuscript group is formed from plural manuscripts that gather together.

Figure 1:
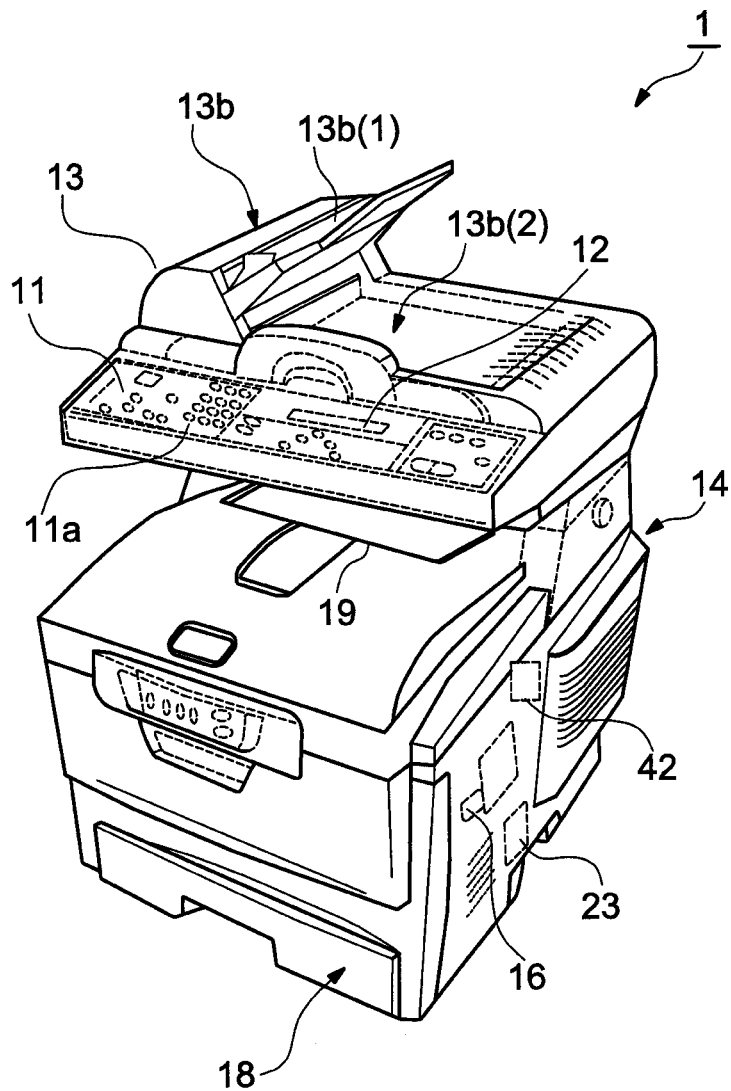
FIG. 1 is an outside view diagram of an image reading apparatus.

FIG. 1 is an outside view diagram of an image reading apparatus.

In the following explanation, an image reading apparatus refers to Multi Function Peripheral (MFP) which has multi functions as a scanner, a copy machine, a printer, a fax machine, etc. Moreover, in order to enable the FIG. 1 to be used in common in embodiment 1 and embodiment 2, in the following explanation, some compositions needed for embodiment 2 also will be described.

As shown by FIG. 1, an image reading apparatus 1 comprises a reading section (scanner) 13 and a printing section (printer) 14. The image reading apparatus 1 further comprises an operating section 11 which has various input keys 11a and receives input of various instructions and data of word and number based on operation of user and displayer 12 which performs display of instruction menu with respect to user and information relative to the obtained image.

Further, the reading section (scanner) 13 is a part that optically reads image information of photo, word and image from manuscript; and generates image signal.

The printing section (printer) 14 is a part that receives image data; and prints image on a record sheet. Further, at the bottom of the printing section 14, there is a paper feeding portion 18 which feeds record sheet; and in the middle of the printing section 14, there is a tray 19 which ejects the record sheet after image is printed on it by printing section 14. Furthermore, a memorizer 42 for recording image data or the like and an electronic file memorizing section 23 which is formed by a magnetic disc device or the like, are furnished.

Further, the image reading apparatus 1 also comprises a communicating section (not shown) which receives and transmits image data and the like via network with an external equipment. The communicating section can receive facsimile data via network such as LAN, internet and the like, as well as through public telephone wires. The following is to explain structure of the system.

Figure 2:
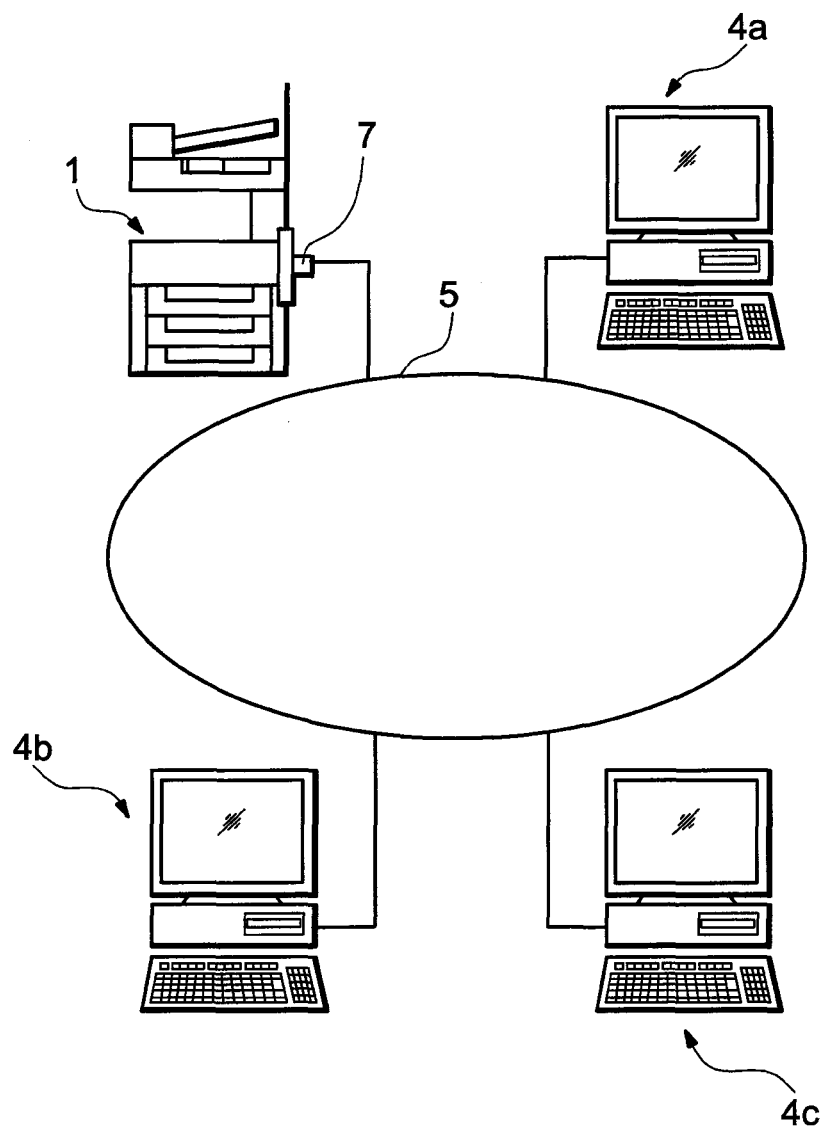
FIG. 2 is a system structural diagram of an image data transmitting system.

FIG. 2 is a system structural diagram of an image data transmitting system.

As shown by FIG. 2, the image reading apparatus 1 is communicatively connected by data receiving devices 4a, 4b and 4c via communication network 5 such as LAN, internet, and public telephone wires.

Figure 3:
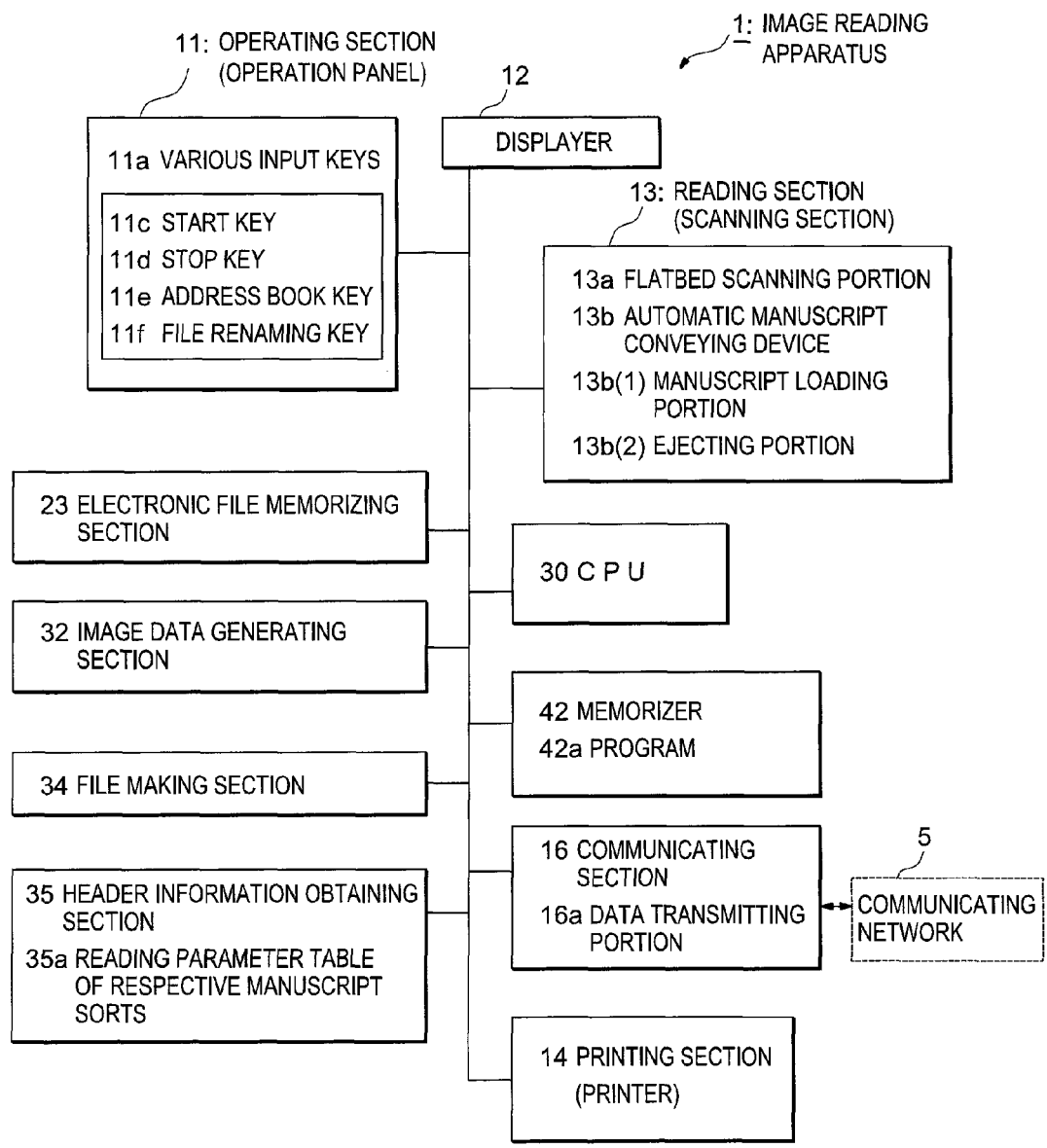
FIG. 3 is a block diagram for showing function of an image reading apparatus in embodiment 1 and embodiment 2.

FIG. 3 is a block diagram for showing function of an image reading apparatus in embodiment 1 and embodiment 2.

As shown by FIG. 3, the image reading apparatus 1 comprises the operating section 11, the displayer 12, the reading section 13, the printing section 14, a communicating section 16, the electronic file memorizer 23, a CPU 30, an image data generating section 32, a file making section 34, a header information obtaining section 35 and the memorizer 42.

The operating section 11 is an operating panel and has the various input keys 11a. Further, the operating section 11 is a part that receives input of various instructions and data of word and number based on operation of user; and that performs display of instruction menu with respect to user and information relative to the obtained image and the like. In the various input keys 11a, as keys used in the embodiment, there are a start key 11c for instructing to start operation, a stop key 11d for instructing to stop operation, an address book key 11e for designating a destination address and a file renaming key 11f for changing file name.

The displayer 12 is a LCD which performs display of instruction menu with respect to user and information relative to the obtained image and the like, that is, the displayer 12 is a part that performs display of a transmission destination list when designating a transmission destination of data; and displays a setting scene when setting scan condition, data transmission condition or the like.

The reading section 13 has a flatbed scanning portion 13a and an automatic manuscript conveying device 13b, as mentioned above, it is a part that reads manuscript. The flatbed scanning portion 13a is a part that scans front page of manuscript which is loaded below the reading section 13 through a mobile reading sensor; and obtains image signal. These compositions stated above are related to this embodiment. Further, the automatic manuscript conveying device 13b is a part that conveys respective sheets one by one according to set conveyance path and ejects them from an ejecting portion 1b (2) after manuscript groups are collectively inserted into a manuscript loading portion 13b (1). In the process, a fixed reading sensor obtains image signal from manuscript. All those compositions are related to embodiment 2 which will be explained later.

As mentioned above, the printing 14 is a part that receives image data; and prints image on a record sheet, that is, it is a part that prints and outputs image on a record sheet on the basis of image data which is obtained from the reading section 13, image data which is received from the external equipment by the communicating section 16 or image data which is memorized in the electronic file memorizing section 23.

The communicating section 16 is part that has a data transmitting portion 16a; performs transmitting and receiving facsimile data via the communication network 5; and performs transmitting and receiving data via email with the external equipment connected with the communication network 5. Therefore, the image reading apparatus 1 not only has a function serving as a fax device which performs a regular facsimile communication, but also has a function serving as a transmitting-and-receiving terminal of email. Accordingly, the image reading apparatus 1 can transmit and receive various image data as attachment of email. Moreover, the network communication executed by the image reading apparatus 1 may be adopted either of wired network communication and wireless network communication. The data transmitting portion 16a is a network interface for communicatively connecting the image reading apparatus 1 with the communicating network 5.

The electronic file memorizing section 23 is a memorizing device that is formed by electronic file made by the file making section 34 and magnetic disc memorizing the received electronic file via communicating network 5.

The CPU 30 starts and generates the image data generating section 32, the file making section 34 and the header information obtaining section 35 as function blocks through executing a program 42a which is memorized in the memorizer 42 in advance. Further, the CPU 30 is a central calculation processing unit that controls all compositions.

The image data generating section 32 is a part that receives image signal from the reading section 13; transfers it into image data; and generates image data. The file making section 34 is a part that makes electronic file from image data.

The header information obtaining section 35 has a reading parameter table of respective manuscript sorts 35a. It is a part that obtains sheet sorts received by the reading section 13. Moreover, in the case that the sheet is a header sheet (it will be explained later), the header information obtaining section 35 is a part that obtains resolution, compression rate, data format information, etc. of the following document sheet on the basis of the reading parameter table of respective manuscript sorts 35a. Here, the content of header sheet and the reading parameter table of respective manuscript sorts 35a will be explained.

FIG. 4 is a format explanatory diagram of a header sheet.

As shown by FIG. 4, a header sheet 6 has an identification mark part 61 for identifying the header sheet 6, a manuscript sort mark part 62 which represents manuscript sort; and a manuscript content describing part 63 for describing content such as keywords, make date and manuscript content that serve as information of manuscript, and as content related to an electronic file to be made.

A sort of document sheet which follows after header sheet, is specified according to a mark that user appends to the manuscript sort mark 62. Here, as an example, it is specified as catalog (color). In the manuscript content describing part 63, keywords, make date, content abstract and the like, are inputted by user.

FIG. 5 is an explanatory diagram of the reading parameter table of respective manuscript sorts.

As shown by FIG. 5, in the reading parameter table of respective manuscript sorts 35a (FIG. 3), respective parameters that correspond to the manuscript sort mark part 62 (FIG. 4) are set in advance. As an example, as mentioned above, in the case that the manuscript sort is specified as catalog (color), the respective parameters are set as resolution 300 dpi, density Normal, compression rate Normal, mode Mixed for reading character/photograph/Mix (character and photograph) and color ON.

Back to FIG. 3 again, the memorizer 42 is a memorizer that memorizes the program 42a in advance. Through executing the program 42, the CPU 30 starts and generates the image data generating section 32, the file making section 34 and the header information obtaining portion 35 as function blocks, further, it also controls all compositions.

The image reading apparatus of embodiment 1 explained above operates as follows:

Firstly, prerequisite of operation will be explained.

Figure 6:
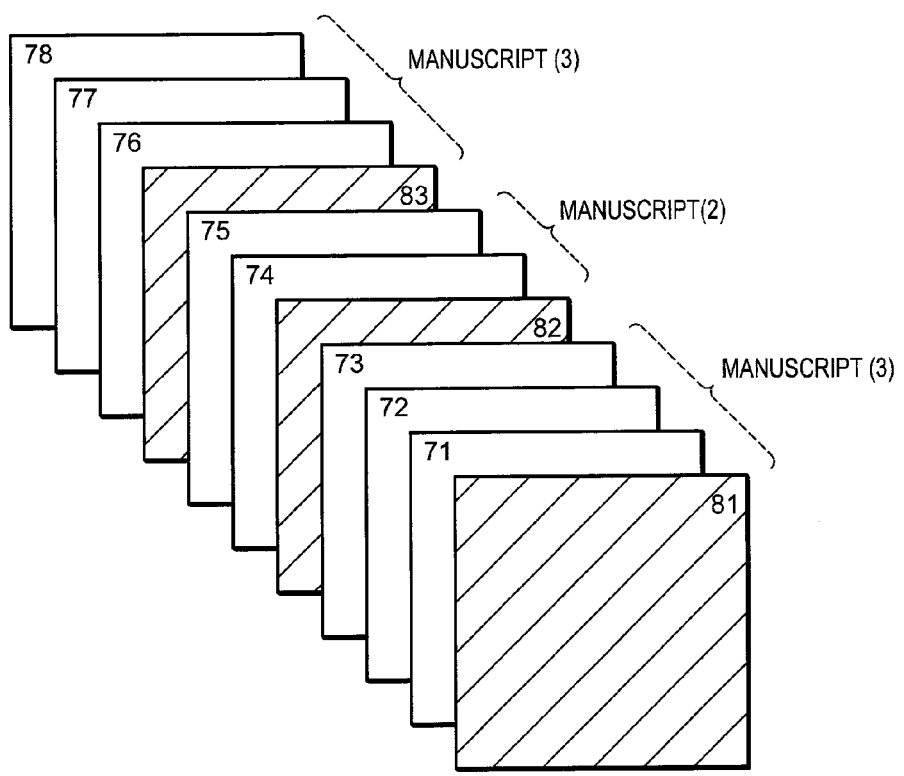
FIG. 6 is an explanatory diagram of an example for showing header sheet and document sheet formed in pairs.

FIG. 6 is an explanatory diagram of an example for showing header sheet and document sheet formed in pairs.

As shown by FIG. 6, as an example, a document (1), a document (2) and a document (3) whose sorts are different, are continuously processed. Here, the document (1) consists of document sheets 71, 72 and 73 that have the same sort; the document (2) consists of document sheets 74 and 75 that have the same sort; and the document (3) consists of document sheets 76, 77 and 78 that have the same sort. In that case, in this invention, a manuscript (1) is formed by appending a first head sheet 81 in front of the document (1); a manuscript (2) is formed by appending a second head sheet 82 in front of the document (2); and a manuscript (3) is formed by appending a third head sheet 83 in front of the document (3). The manuscript (1), the manuscript (2) and the manuscript (3) that have different sort, are continuously processed. Moreover, in the header sheets 81, 82 and 83, predetermined information is set by user.

Regarding function and operation relative to scan transmission, to transmit image data to the data receiving devices 4a, 4b and 4c serving as transmission destinations via communication network 5 after the image reading apparatus 1 obtains image data through scanning manuscript by the reading section 13. It will be explained in detail though using a flowchart together with FIG. 1 to FIG. 6.

Figure 7:
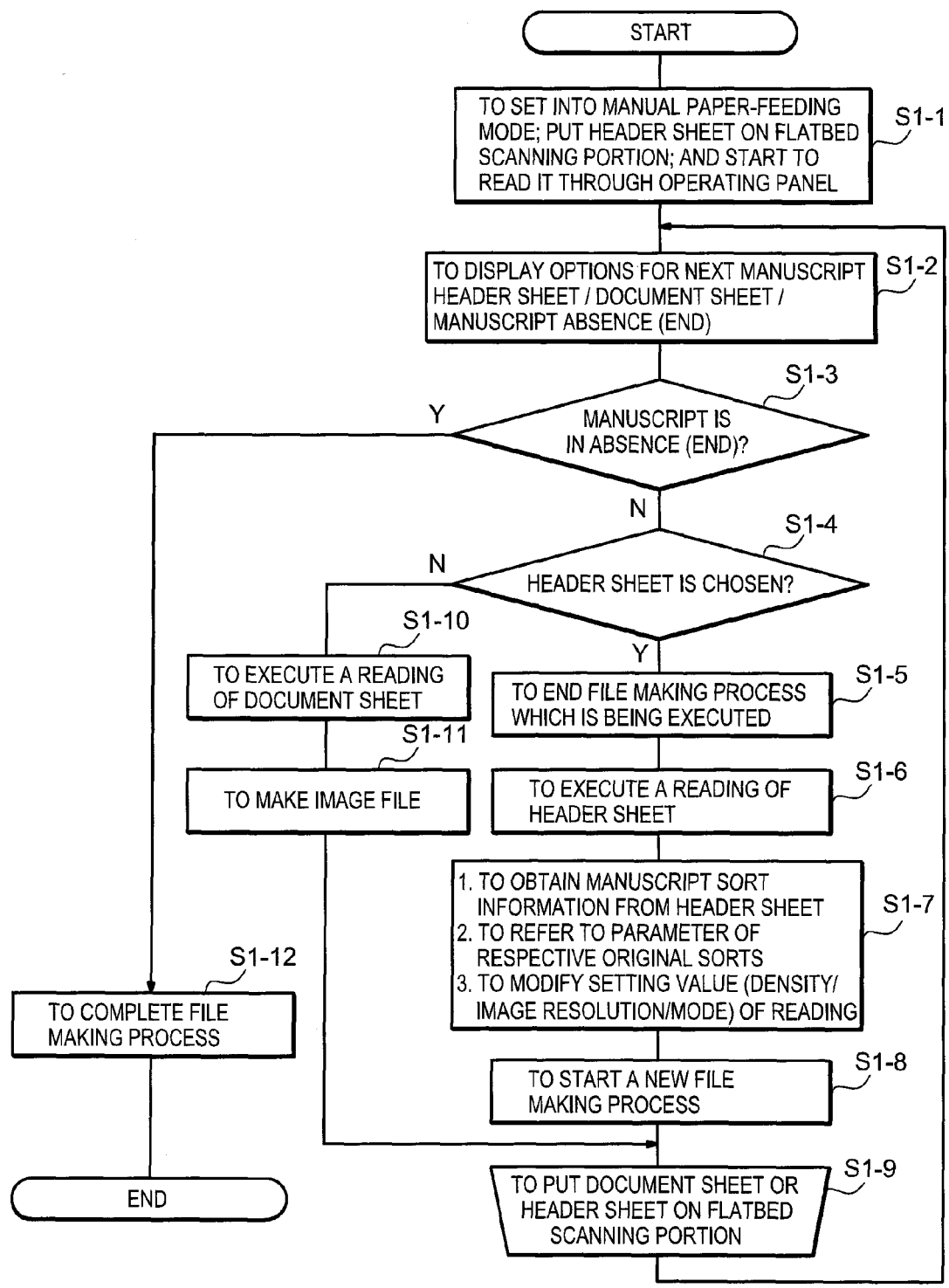
FIG. 7 is an operation flowchart of an image reading apparatus in embodiment 1.

FIG. 7 is an operation flowchart of an image reading apparatus in embodiment 1.

In embodiment 1, the case that manuscript groups are processed through using the flatbed scanning portion 13a of the reading section 13, will be only explained. Regarding the case that manuscript groups are processed through using the automatic manuscript conveying device 13b, it will be explained later as embodiment 2 of this invention.

Step S1-1

Through the various input key 11a of the operating section 11, user designates reading method which integrates manuscripts read by the flatbed scanning section 13a into one electronic file. After the user puts the first header sheet 81 (FIG. 6) onto the flatbed scanning portion 13a and presses the start key 11c, the flatbed scanning portion 13a starts to scan the first header sheet 81. The scanning process is performed according to predetermined setting (e.g., 300 dpi, color, etc.).

Step S1-2

After the CPU30 obtains destination information, file name, scan condition and setting of operation mode that are designated by user, the displayer 12 displays information to remind user to select one of header sheet, document sheet, or manuscript absence (end) regarding next manuscript. Here, before user selects header sheet or document sheet, the user needs to change the manuscript on the flatbed scanning portion.

Step S1-3

After finished reading of all manuscripts, in the case that "manuscript absence" is selected, step S1-12 is started; if not, step S1-4 is started.

Step S1-4

In the case that header sheet is selected, step S1-5 is started; in the case that document sheet is selected, step S1-10 is started.

Step S1-5

The file making section 34 finishes file making process (that is, to close the previous file and memorize it as a finished file).

Step S1-6

The header information obtaining section 35, after obtained destination information, file name, scan condition and setting of operation mode that are assigned by user, starts to read out header sheet. The scanning process is performed according to predetermined setting.

Step S1-7

The header information obtaining section 35 obtains manuscript sort information (from position of the manuscript sort mark 62) from header sheet; on the basis of the information, obtains a reading parameter from the reading parameter table of respective manuscript sorts 35a when reading image by reading section 13 and making image file by file making section 34; and changes a setting value when reading by reading section 13. For example, as information of header sheet, when a position corresponding to the "catalog (color)" in the manuscript sort mark part 62 is marked, the CPU 30 refers to the reading parameter table of respective manuscript sorts (FIG. 5) in the header information obtaining section 35; obtains information about image resolution (300 dpi), density (Normal), compression rate (Normal), mode (Mixed), color (ON) from a line of No. 1 "catalog (Color)"; and changes setting value when reading the reading section 13 as a reading setting.

Step S1-8

The file making section 34 opens file according to the specified file name; reads out manuscript according to the reading mode which is set in step S1-7; memorizes data into file and starts to execute new file.

Step S1-9

When user loads following document sheet or header sheet on the flatbed scanning portion 13a, the flow returns to step S1-2 and step S1-2 to step S1-9 are repeated; when reading of all manuscript is finished, the flow skips to step S1-12 from step S1-3.

Step S1-10

The flow is shifted to selection process of document sheet, the reading section 13 reads out document sheet according to setting information obtained from the corresponding header sheet. The read image signal is changed into digital data (image data) by the image data generating section 32 according to information of compression rate or the like that is obtained from the reading parameter table of respective manuscript sorts 35a; further is transmitted to the file making section 34.

Step S1-11

The file making section 34, when receives the image data through performing a predetermined process and adding image data of, for example, in PDF (Portable Document Format) format into the file which is set according to the corresponding header sheet, makes an image file; and then, step S1-9 is started.

Step S1-12

The file making process is finished; and the flow is finished.

As shown by FIG. 6, in one manuscript group, in the case that there are plural header sheets like the first header sheet 81, the second header sheet 82 and the third header sheet 83, in the above series of processes, the selection of sheet (S1-2) is repeated according to the number of header sheets. Further, as shown by FIG. 6, in the case that process of the manuscript (1) is finished and process of the manuscript (2) is started, when the header sheet 82 is loaded on the flatbed scanning portion 13a, through selecting the header sheet again from manuscript selection scene (S1-2) for the next document, file making process of previous manuscript is ended (S1-5).

Next, the displayer 12 performs a display for reminding user to input a file name of next manuscript. After the user inputted the file name of the next manuscript through using the various input key 11a, a reading of the header sheet 82 is performed (S110). Through the same order mentioned above, a setting value for reading out the next document sheet is changed (S1-7). Through user loads the next document sheet on the flatbed scanning portion 13a; and selects document sheet on the manuscript selection scene (S1-2) mentioned above, the next manuscript (2) is made as another image file (S1-11). According to the read page number, image data is accumulated into the electronic file memorizing section 23.

In the case that reading of manuscript group is finished, "manuscript absence (END)" is selected on the manuscript selection scene (S1-2) mentioned above; then, file making process is completed (S1-12). In the example shown by FIG. 6, only one time of operation is needed to read three groups of manuscripts with different kinds. These files made as the above are transmitted to the communication network 5 via data transmitting portion 16a which composes transmitting function (transmitting means) of the communicating section 16. At that time, each file is transmitted to each destination address specified by user through the operating section 11. Moreover, the data transmitting portion 16a may transmit transmitting use file to other data receiving devices through communication network.

As explained above, according to the invention described in embodiment 1, in the case that the flatbed scanning portion reads out manuscript group page by page and transmits an image file, such structure is adopted to obtain reading setting information from header sheet 6 which described manuscript sort and manuscript content information, and reads document sheet according to the obtained setting information and transfers it into electronic file. Therefore, it is not necessary to re-start the reading operation of next document. As a result, it is possible to effectively perform reading process.

Embodiment 2

In embodiment 1 mentioned above, it is only to explain the case that the flatbed scanning portion 13a in the reading section 13 is used. In embodiment 2, it will be explained the case to use the automatic manuscript conveying device 13b instead of the flatbed scanning portion 13a. Because an image reading apparatus in the embodiment 2 is the same as that in embodiment 1, its structural explanation is omitted, and the following is only to explain about its operation.

Figure 8:
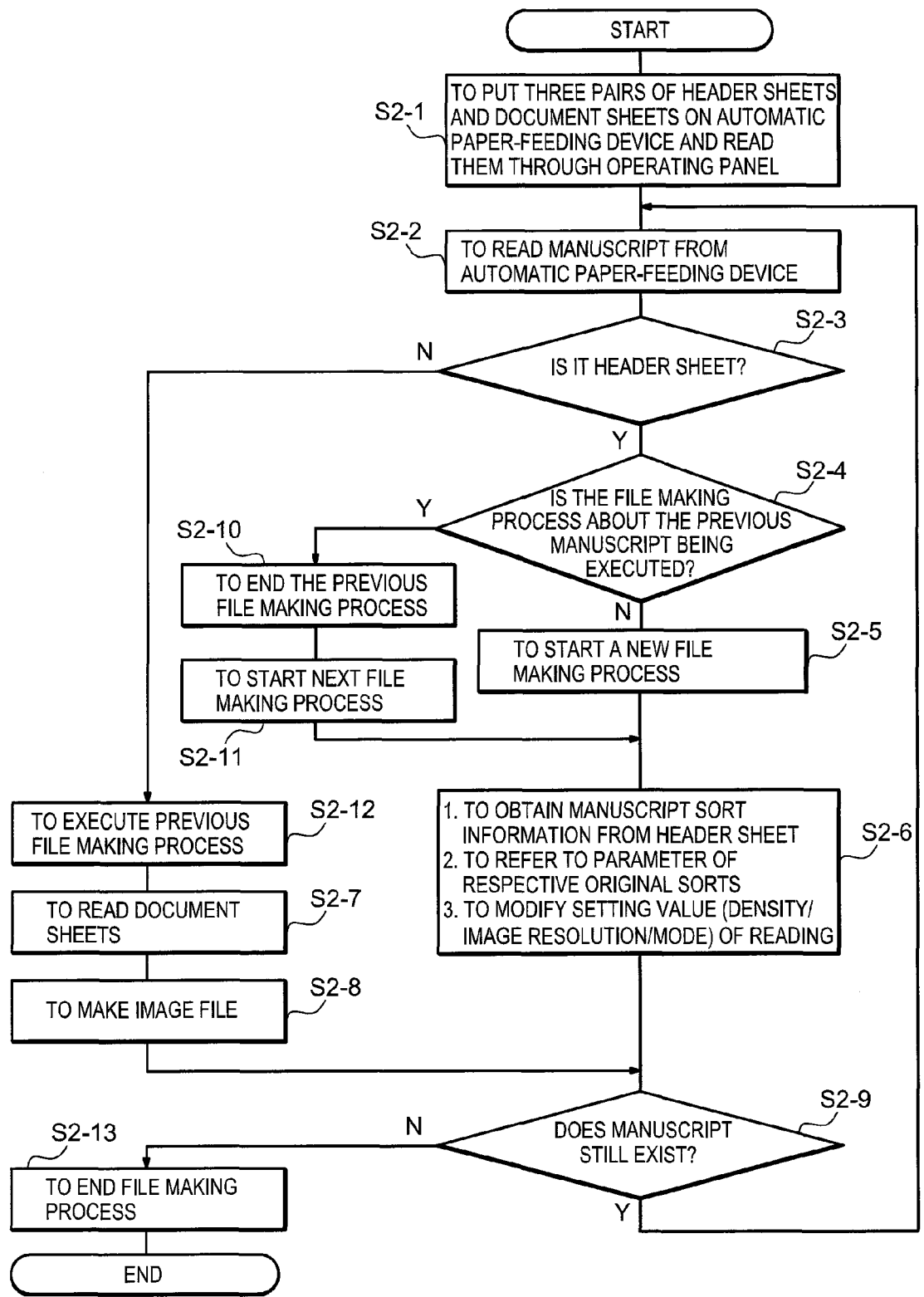
FIG. 8 is an operation flowchart of an image reading apparatus in embodiment 2.

FIG. 8 is an operation flowchart of an image reading apparatus in embodiment 2.

The flowchart shows the case to process through using the automatic manuscript conveying device 13b in the image reading apparatus 1 described in FIG. 1 to FIG. 5.

Step S2-1

User collectively inserts manuscript group (FIG. 6) formed from plural manuscripts into the manuscript loading portion 13b (1) as an example. Through the various input keys 11a in the operating section 11, user uses the operating section 11 to instruct to start a scanning.

Step S2-2

The CPU 30 makes the automatic manuscript conveying device 13b synchronize with a reading mechanism (not shown) of the reading section 13 so as to operate; and controls the reading section 13 to automatically read out manuscript one by one from the automatic manuscript conveying device 13b. The scanning of first page is executed according to a predetermined setting.

Step S2-3

The CPU 30 makes the header information obtaining section 35 function to judge whether the read image is a header sheet or not. If the read image is a header sheet, step S2-4 is started; if not, step S2-12 is started. The judgment of header sheet is executed according to whether there is a predetermined mark (FIG. 4) or not at the top of the sheet.

Step S2-4

In the case that the header information obtaining section 35 judged that manuscript is a header sheet, the CPU 30 confirms whether previous manuscript is in file making process or not with respect to the file making section 34. If it is in the file making process, step S2-10 is started; if it is not, step S2-5 is started.

Step S2-5

The file making section 34 opens file according to file name which is assigned by user; and starts new file making process.

Step S2-6

The header information obtaining section 35 obtains manuscript sort information (from position of the manuscript sort mark 62) from header sheet; on the basis of the information, obtains a reading parameter from the reading parameter table of respective manuscript sorts 35a when reading image by reading section 13 and making image file by file making section 34; and changes a setting value when reading by reading section 13. For example, as information of header sheet, when a position corresponding to the "catalog (color)" in the manuscript sort mark part 62 is marked, the CPU 30 refers to the reading parameter table of respective manuscript sorts (FIG. 5) in the header information obtaining section 35; obtains information about image resolution (300 dpi), density (Normal), compression rate (Normal), mode (Mixed), color (ON) from a line of No. 1 "catalog (Color)"; and changes setting value when reading the reading section 13 as a reading setting.

Step S2-7

The flow is shifted to selection process of document sheet, the reading section 13 reads out document sheet according to setting information obtained from the corresponding header sheet. The read image signal is changed into digital data (image data) by the image data generating section 32 according to information of compression rate or the like that is obtained from the reading parameter table of respective manuscript sorts 35a; further is transmitted to the file making section 34.

Step S2-8

The file making section 34, when receives the image data through performing a predetermined process and adding image data of, for example, in PDF (Portable Document Format) format into the file which is set according to the corresponding header sheet, makes an image file.

Step S2-9

In the case that reading of all manuscripts is completed and there is no manuscript, step S2-13 is started; if not, the flow returns to step S2-2 and step S2-2 to step S2-9 are repeated; when all reading of manuscript is finished, the flow skips to step S2-13 from step S2-9.

Step S2-10

The file making process of previous manuscript in the file making section 34 is finished (that is, to close the previous file and memorize it as a finished file).

Step S2-11

The file making section 34 opens file according to file name which is specified by user; starts to execute next file making process; and then, step S2-6 is started.

Step S2-12

Because the header information obtaining section 35 judged that it is not header sheet, the file making section 34 executes regular file making process and step S2-7 is started.

Step S2-13

File making process is finished and the flow is ended (that is, to close the previous file and memorize it as a finished file).

These files made as the above are transmitted to the communication network 5 via data transmitting portion 16a which composes transmitting function of the communicating section 16. At that time, the CPU 30 supplies destination address which is designated by user to the data transmitting portion 16a through the operating section 11. The data transmitting portion 16a transmits electronic file to one of data receiving devices 4a, 4b and 4c, which corresponds to the designated destination address. Further, the data transmitting portion 16a may transmit transmission file to other external equipment through communication network 5.

As explained above, according to embodiment 2, it is possible to obtain reading setting information from header sheets inserted in the front of plural manuscripts that are continuously transmitted by automatic manuscript conveying device; then, read out document sheet according to the obtained setting information; and transfer it into electronic file. As a result, because manuscript group can be read out automatically according to appropriate setting of each manuscript; and be divided into plural files, it become easier for user to manage file.

Embodiment 3

Figure 9:
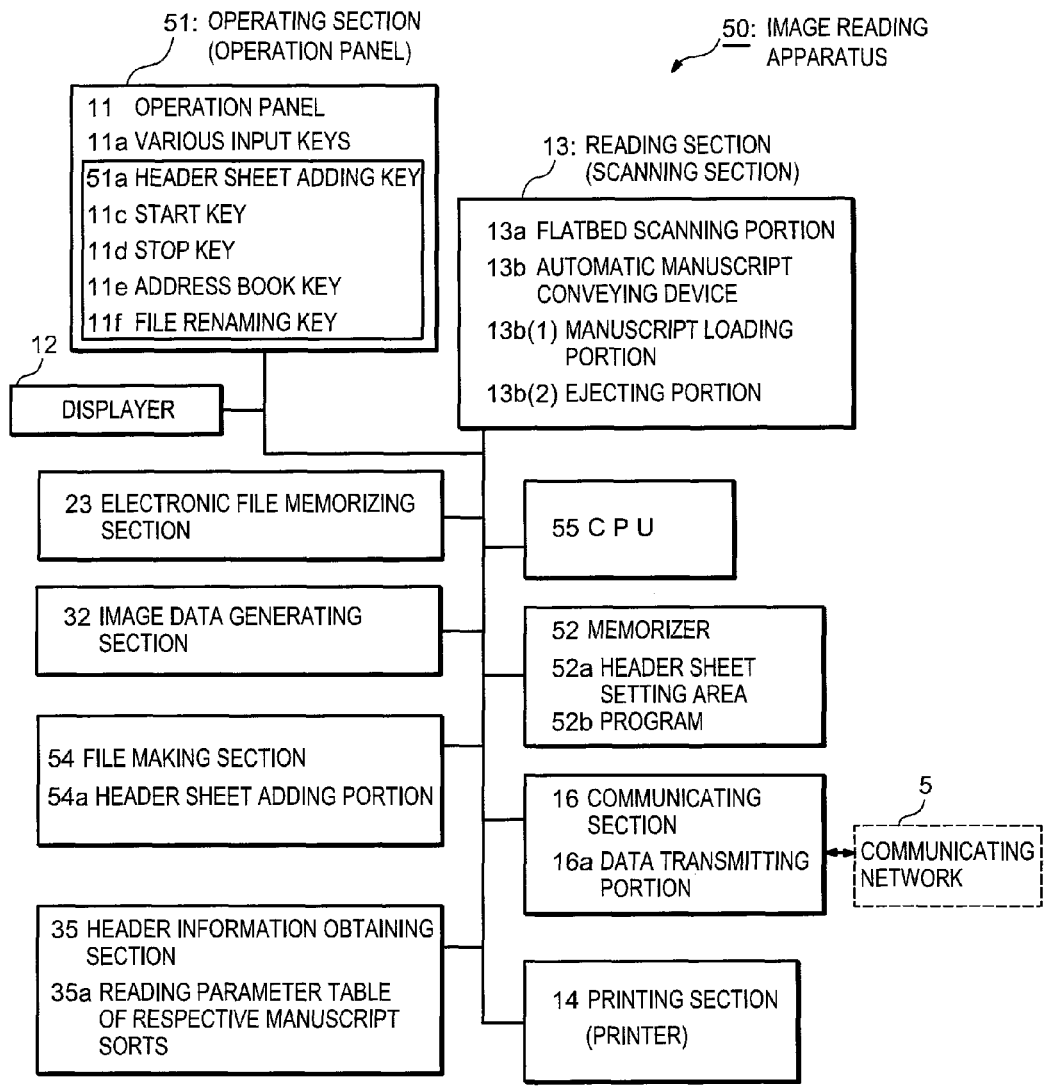
FIG. 9 is a block diagram for showing function of an image reading apparatus in embodiment 3.

FIG. 9 is a block diagram for showing function of an image reading apparatus in embodiment 3.

As shown by FIG. 9, an image reading apparatus 50 comprises an operating section 51, a displayer 12, a reading section 13, a printing section 14, a communicating section 16, an electronic file memorizing section 23, a CPU 55, an image data generating section 32, a file making section 54, a header information obtaining section 35 and a memorizer 52.

The following is only to explain in detail the part different from the embodiment 1 and embodiment 2, the same symbols are assigned and their explanations are omitted.

The operating section 51 is an operating panel and has the various input keys 11a. Further, the operating section 51 is a part that receives input of various instructions and data of word and number based on operation of user; and that performs display of instruction menu with respect to user and information relative to the obtained image and the like. In the various input keys 11a, as keys used in the embodiment, there are a start key 11c for instructing to start operation, a stop key 11d for instructing to stop operation, an address book key 11e for designating a destination address and a file renaming key 11f for changing file name.

Furthermore, the operating section 51 also has a header sheet appending key which is possible for user to instruct to append the read header sheet to the front of electronic file.

The memorizer 52 is a memorizer that memorizes a program 52b in advance and has a header sheet setting area 52a.

Through executing the program 52b, the CPU 55 starts and generates the image data generating section 32, the file making section 54 and the header information obtaining section 35 as functional blocks, further, it also controls all compositions. The header sheet setting area 52a is a memorizing part which memorizes instruction of user about appending header sheet to the front of electronic file.

The CPU 55 starts and generates the image data generating section 32, the file making section 54 and the header information obtaining section 35 as function blocks through executing the program 52b which is memorized in the memorizer 52 in advance. Further, the CPU 55 is a central calculation processing unit that controls all compositions.

The image reading apparatus 50 of embodiment 3 mentioned above, operates as follows.

Figure 10:
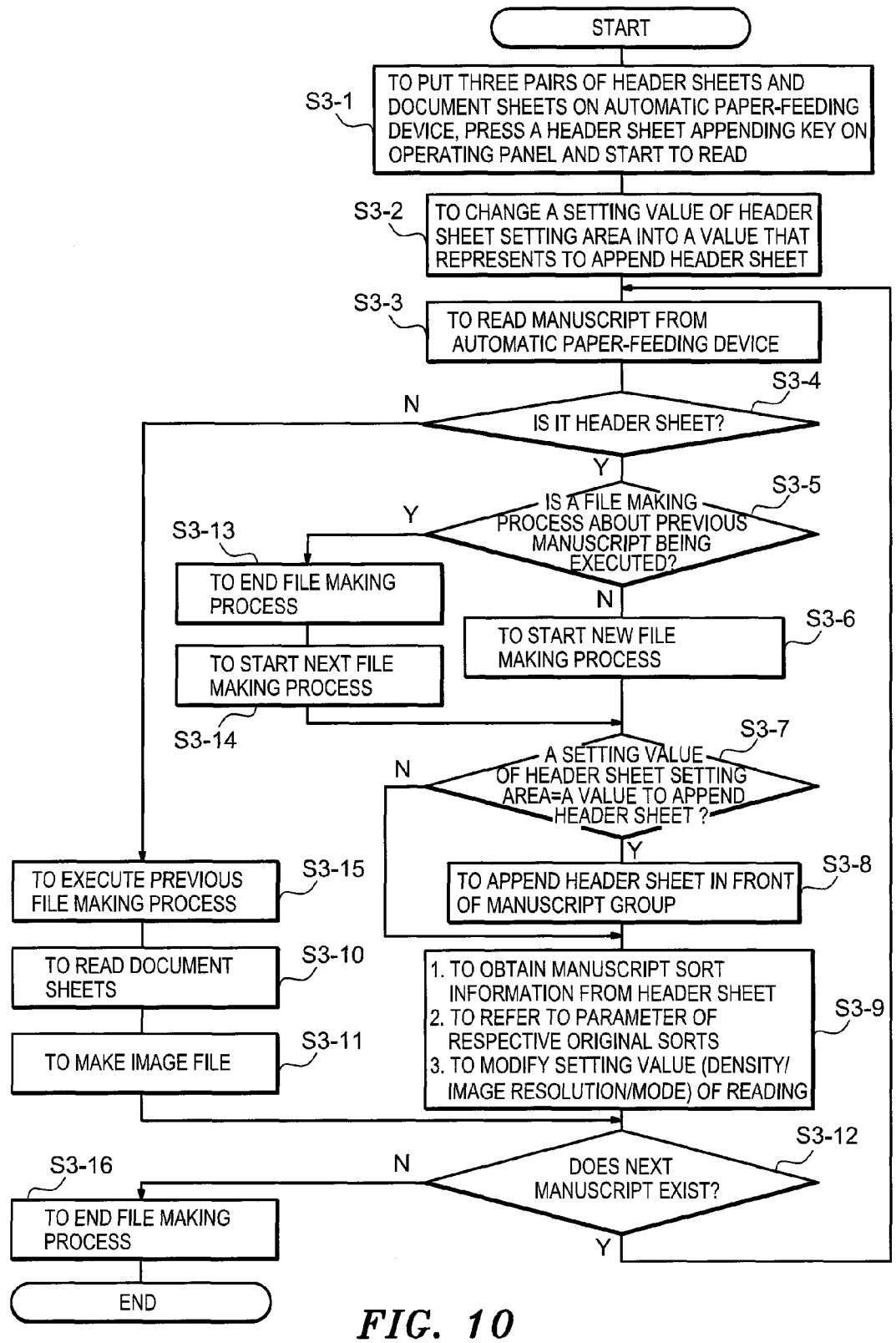
FIG. 10 is an operation flowchart of an image reading apparatus in embodiment 3.

FIG. 10 is an operation flowchart of an image reading apparatus in embodiment 3.

FIG. 10 is a flowchart for explaining the case that user instructs to append the read header sheet to the front of electronic file. Regarding its operation, it will be explained in detail together with FIG. 9.

Step S3-1

User collectively inserts manuscript group (FIG. 6) formed from plural manuscripts into the manuscript loading portion 13b (1) as an example; presses the header sheet appending key 51a for appending the read header sheet data to the front of manuscript electronic file to be made; after that, the user instructs a scan start by using the various input keys 11a of the operating section 51.

Step S3-2

The CPU 55 changes the setting value of the header sheet setting area 52a into a value that indicates a header sheet appendage (e.g., ON).

Step S3-3

The CPU 55 makes the automatic manuscript conveying device 13b synchronize with a reading mechanism (not shown) of the reading section 13 so as to operate; and controls the reading section 13 to automatically read out manuscript one by one from the automatic manuscript conveying device 13b. The scanning of first page is executed according to a predetermined setting.

Step S3-4

The CPU 55 makes the header information obtaining section 35 function to judge whether the read image is a header sheet or not. If the read image is a header sheet, step S3-5 is started; if not, step S3-15 is started.

Step S3-5

In the case that the header information obtaining section 35 judged that manuscript is a header sheet, the CPU 55 confirms whether previous manuscript is in file making process or not with respect to the file making section 54. If it is in the file making process, step S3-13 is started; if it is not, step S3-6 is started.

Step S3-6

The file making section 54 opens file according to file name which is assigned by user; and starts new file making process.

Step S3-7

The CPU 55 searches the header sheet setting area 52a; and confirms whether there is a setting value indicating header sheet data is appended in the front of electronic file or not. If it is an appending setting, step S3-8 is started; if it is not, step S3-9 is started.

Step S3-8

The file making section 54 appends the read header sheet data to the front of each file in manuscript group.

Step S3-9

The header information obtaining section 35 obtains manuscript sort information (from position of the manuscript sort mark part 62) from header sheet; on the basis of the information, obtains a reading parameter from the reading parameter table of respective manuscript sorts 35*a* when reading image by reading section 13 and making image file by file making section 54; and changes a setting value when reading by reading section 13. For example, as information of header sheet, when a position corresponding to the "catalog (color)" in the manuscript sort mark part 62 is marked, the CPU 55 refers to the reading parameter table of respective manuscript sorts (FIG. 5) in the header information obtaining section 35; obtains information about image resolution (300 dpi), density (Normal), compression rate (Normal), mode (Mixed), color (ON) from a line of No. 1 "catalog (Color)"; and changes setting value when reading the reading section 13 as a reading setting.

Step S3-10

The flow is shifted to selection process of document sheet, the reading section 13 reads out document sheet according to setting information obtained from the corresponding header sheet. The read image signal is changed into digital data (image data) by the image data generating section 32 according to information of compression rate or the like that is obtained from the reading parameter table of respective manuscript sorts 35*a*; further is transmitted to the file making section 54.

Step S3-11

The file making section 54, when receives the image data through performing a predetermined process and adding image data of, for example, in PDF (Portable Document Format) format into the file which is set according to the corresponding header sheet, makes an image file.

Step S3-12

In the case that reading of all manuscripts is completed and there is no manuscript, step S3-16 is started; if not, the flow returns to step S3-3 and step S3-3 to step S3-12 are repeated; when all reading of manuscript is finished, the flow skips to step S3-16 from step S3-12.

Step S3-13

The file making process of previous manuscript in the file making section 54 is finished (that is, to close the previous file and memorize it as a finished file).

Step S3-14

The file making section 54 opens file according to file name which is specified by user; starts to execute next file making process; and then, step S3-7 is started.

Step S3-15

Because the header information obtaining section 35 judged that it is not header sheet, the file making section 54 executes regular file making process and step S3-10 is started.

As explained above, according to embodiment 3, because header sheet data is appended to the front of each file in plural manuscripts is conveyed continuously by automatic manuscript conveying device, it is possible to confirm sort of the following document file through only checking the first page of electronic file. As a result, it is possible for user to easily manage file.

Regarding expansion example of this invention, it will be explained.

In the above embodiment 1 to embodiment 3, as shown by FIG. 6, in the case that the document (1) consists of document sheets 71, 72 and 73, the document (2) consists of document sheets 74 and 75 and the document (3) consists of document sheets 76, 77 and 78 are collectively processed as manuscript group, header sheet is inserted into the front of each document. However, in the expansion example, such process is executed without inserting header sheet. The following is to explain in detail the process.

Figure 11:
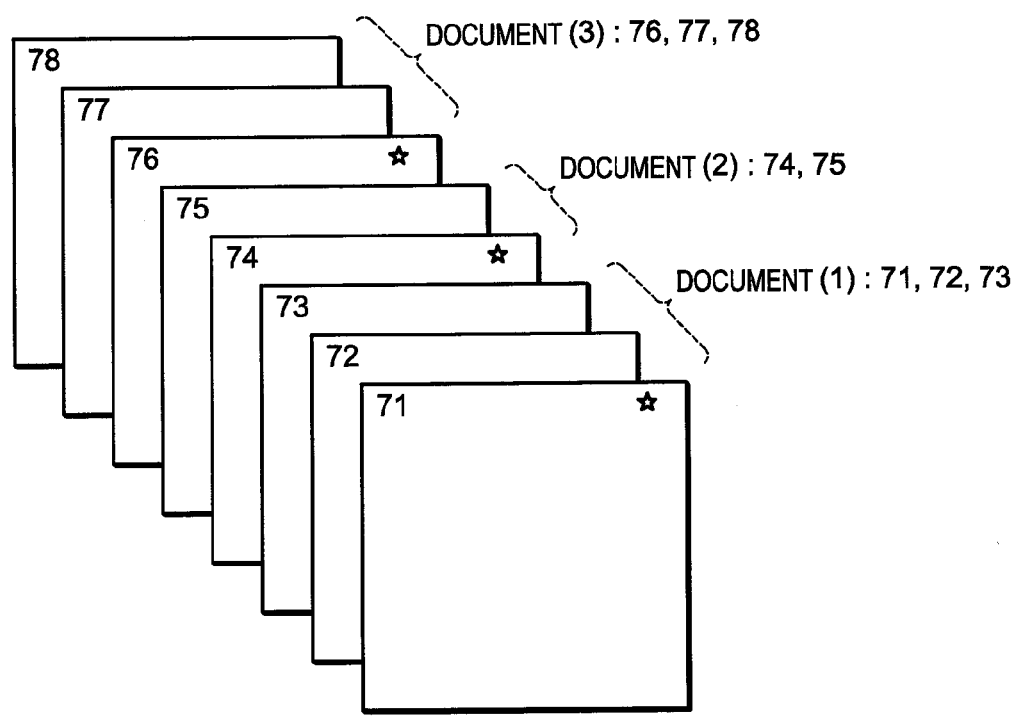
FIG. 11 is an explanatory diagram of an expansion example of this invention.

FIG. 11 is an explanatory diagram of an expansion example of this invention.

As shown by FIG. 11, in the expansion example, header identification mark is appended (e.g. a Star in the diagram) to the upper part (e.g. the position in which an identifying mark part 61 (FIG. 4) is furnished) of first document sheet (here, it corresponds to document sheet 71, 74 or 76) in each document. An identifying section (it corresponds to the header information obtaining section 35 in the above embodiments) identifies a predetermined mark in predetermined position of document sheet. By this, it is possible to identify the division (header) between respective manuscripts, therefore, the same effect can be obtained as that in embodiment 1 or 2.

Further, as a further expansion example, in the case that the document (1) consists of the document sheets 71, 72 and 73, the document (2) consists of the document sheets 74 and 75 and the document (3) consists of the document sheets 76, 77 and 78 are collectively processed as manuscript group, such structure can be adopted to designate order and page number in printer menu per document sheets and to enable a reading section (it corresponds to the reading section 13 in the above embodiments) to identify switch among the document (1), the document (2) and the document (3) on the basis of the printer menu. That is, if page numbers such as 3, 2 and 3 are inputted in advance, an identifying section of first page will identify respective collections of manuscripts according to the setting of the page numbers.

Moreover, as sheet, not only paper can be used, but also record material with sheet shape such as film and the like can be used. The utilization possibility in industry This invention can be applied to image reading apparatus such as copying apparatus, facsimile apparatus and scanning apparatus that memorize read manuscript as an electronic file.

This invention is not limited to the foregoing embodiments but many modifications and variations are possible within the spirit and scope of the appended claims of the invention.

What is claimed is:

1. A method for reading sequentially a manuscript group made of plural sheets and dividing the manuscript group into manuscript data, the method being used by a read-data dividing system that includes (i) a reading section, (ii) a header information obtaining section, (iii) a file making section, and (iv) an electronic file memorizing section, the method comprising the steps of:

reading, by the reading section, sequentially the manuscript group made of the plural sheets to produce reading data;

analyzing, by the header information obtaining section, each reading data of the sheet produced at the reading step and judging whether or not the sheet is added with a predetermined mark; and dividing, by the file making section, the manuscript group data by the reading data of the sheet added with the predetermined mark into plural manuscript data in a case where the sheet is judged as being added with the predetermined mark at the judging step, and thereafter, storing, by the electronic file memorizing section, collectively each of the manuscript data including the reading data of the sheet added with the predetermined mark in a storing region.

2. The method according to claim 1, further comprising the step of:

reading sequentially the plural sheets by an automatic document conveying device.

3. The method according to claim 1, further comprising the steps of:
- obtaining sort information from the sheet having the predetermined mark; and
- reading a sheet having no predetermined mark based on the obtained sort information.

4. The method according to claim 3, further comprising the step of:
- converting the obtained sort information into setting information which corresponds to the sort information and is used for a reading operation.

5. The method according to claim 1, further comprising the step of:
- receiving a manuscript group producing an electronic file by combining the sheet having the predetermined mark with at least one sheet with no predetermined mark subsequent thereto.

6. The method according to claim 5, wherein the predetermined mark included in the header sheet is added to each electronic file.

7. The method according to claim 1, further comprising the steps of:
- selecting whether or not the reading data of the sheet having the predetermined mark are to be stored in the storing region; and
- storing the reading data of the sheet having the predetermined mark in the storing region in a case where the reading data of the sheet are selected to be stored in the selecting step.

8. A method for reading sequentially plural sets of manuscripts as a manuscript group, the method being used by a read-data separating system that includes (i) a reading section, (ii) a header information obtaining section, and (iii) an electronic file memorizing section, the method comprising the steps of:
- reading, by the reading section, sequentially the manuscript group;
- judging, by the header information obtaining section, each set of the manuscript included in the manuscript group read at the reading step; and
- storing, in the electronic file memorizing section, together reading data of each set of the manuscript judged at the judging step, wherein each set of the manuscript is stored in a separate file.

9. The method according to claim 8,
- wherein each manuscript includes a header sheet, and identification information is added to a predetermined position of the header sheet, and
- wherein the header sheet is identified based on the identification information.

10. The method according to claim 9, wherein the identification information is a predetermined mark.

11. The method according to claim 8, further comprising the steps of:
- displaying a sheet number input scene to allow a user to input respective sheet numbers of the plural manuscripts,
- wherein each manuscript includes a header sheet, each header sheet is identified based on the respective sheet numbers.

12. The method according to claim 8, further comprising the steps of:
- selecting whether or not reading data of a header sheet of the manuscript is to be stored; and
- determining whether the reading data of the header sheet are to be stored or not based on an instruction selected at the selecting step.

13. A method for reading sequentially a manuscript group made of plural sheets and dividing the manuscript group into manuscript data, the method being used by an a read-data dividing system that includes (i) a reading section, (ii) a header information obtaining section, and (iii) a file making section, the method comprising the steps of:
- reading, by the reading section, sequentially the manuscript group made of the plural sheets to produce reading data;
- analyzing, by the header information obtaining section, each reading data of the sheet produced at the reading step and judging whether or not the sheet is added with a predetermined mark; and
- dividing, by the file making section, the manuscript group data by the reading data of the sheet added with the predetermined mark into plural manuscript data in a case where the sheet is judged as being added with the predetermined mark at the judging step, and thereafter, storing collectively each of the manuscript data excluding the reading data of the sheet added with the predetermined mark in a storing region.

14. The method according to claim 13, further comprising the steps of:
- selecting whether or not the reading data of the sheet having the predetermined mark are to be stored in the storing region; and
- deleting the reading data of the sheet having the predetermined mark without storing in the storing region in a case where the reading data of the sheet are selected not to be stored at the selecting step.

* * * * *